United States Patent [19]

Young et al.

[11] 4,137,771

[45] Feb. 6, 1979

[54] REPLACEABLE SENSING AND INDICATING ELEMENT FOR A BI-METALLIC THERMOMETER

[75] Inventors: Dan B. Young, Cincinnati; Benjamin L. Binford, Pleasant Plain, both of Ohio

[73] Assignee: Palmer Instruments, Inc., Cincinnati, Ohio

[21] Appl. No.: 779,190

[22] Filed: Mar. 18, 1977

[51] Int. Cl.² .............................................. G01K 5/68
[52] U.S. Cl. ..................................... 73/363.9; 73/431
[58] Field of Search ...................... 73/363.9, 431, 375; 116/129 A; 235/78 A

[56] References Cited

U.S. PATENT DOCUMENTS

| | | | |
|---|---|---|---|
| 3,091,966 | 6/1963 | Huston et al. | 73/363.9 X |
| 3,122,018 | 2/1964 | Freeman et al. | 73/363.9 |
| 3,279,257 | 10/1966 | Hunt | 73/363.9 |
| 3,857,286 | 12/1974 | Bissell et al. | 73/363.9 |
| 3,889,840 | 6/1975 | Price | 73/431 X |
| 3,952,596 | 4/1976 | Patel | 73/363.9 |

Primary Examiner—Daniel M. Yasich
Attorney, Agent, or Firm—Melville, Strasser, Foster & Hoffman

[57] ABSTRACT

A replaceable sensing and indicating element for a bi-metallic thermometer of the type having an enclosure and a stem. The sensing and indicating element comprises a stem terminating in a bi-metal helical temperature sensing coil, a shaft extending inside the stem from the coil, an indicating pointer secured to the shaft, a calibrated temperature scale, adjustment means for orienting the scale, and a connector affixed to the sensing element stem. The sensing element is telescopically received within the thermometer enclosure and stem and is held in place by a bezel ring and restraining means. Accordingly, the sensing element may be easily removed from and replaced in the enclosure.

4 Claims, 7 Drawing Figures

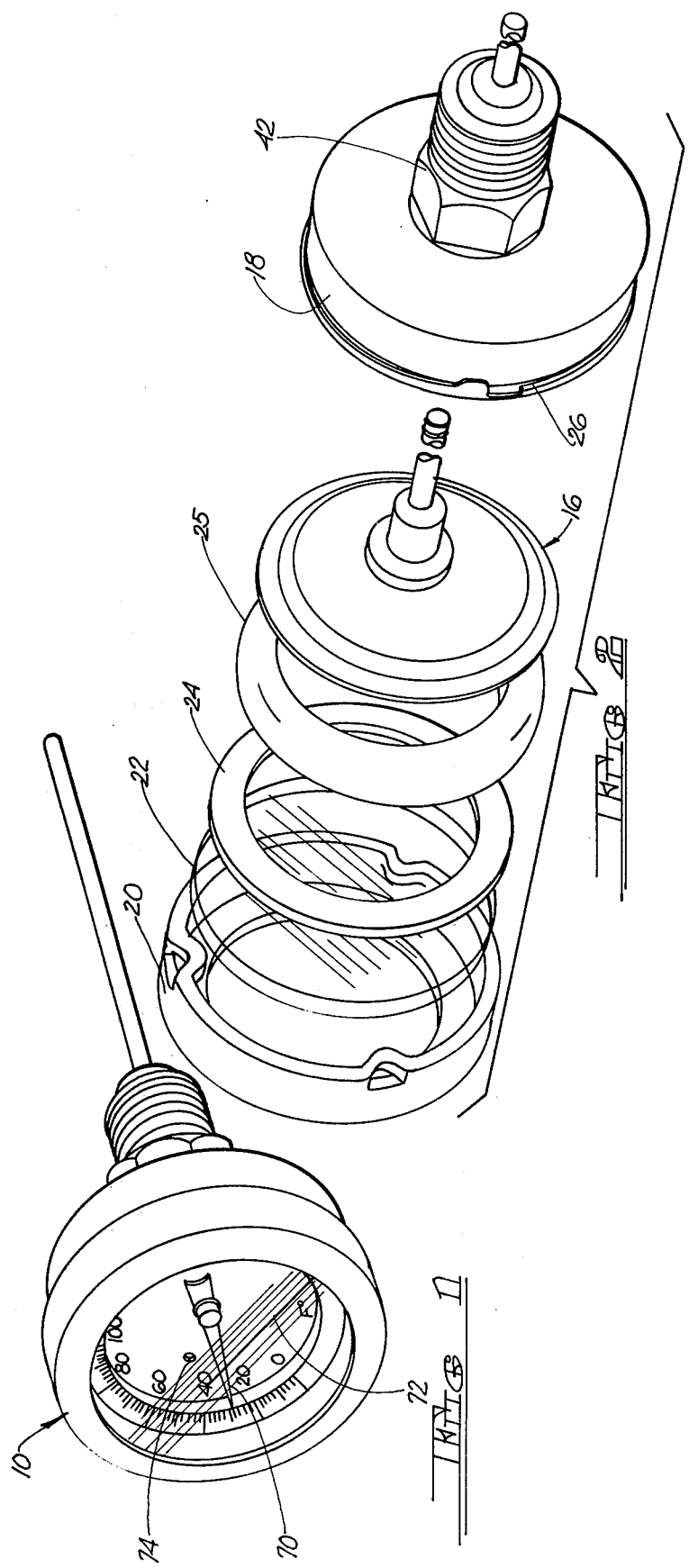

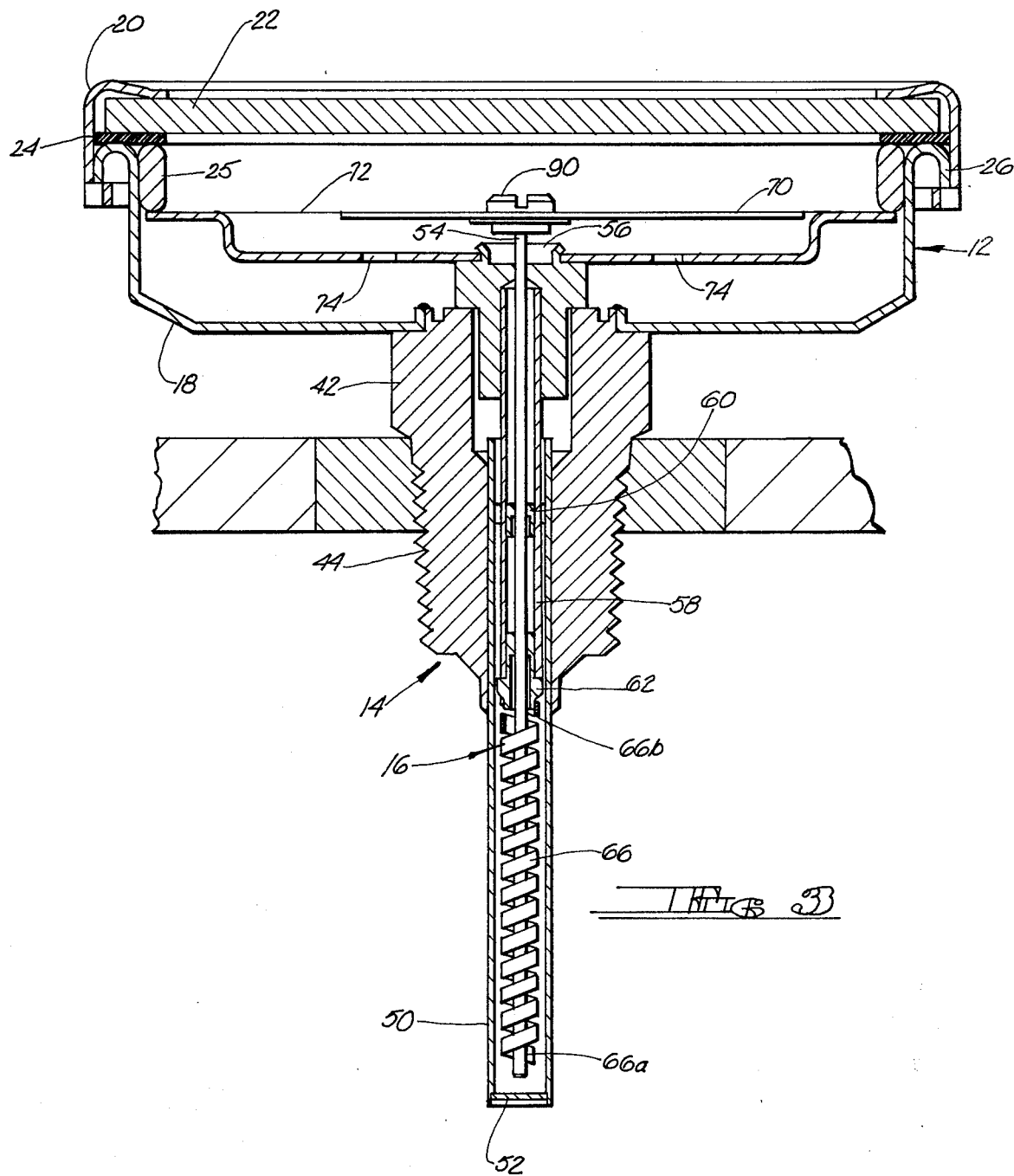

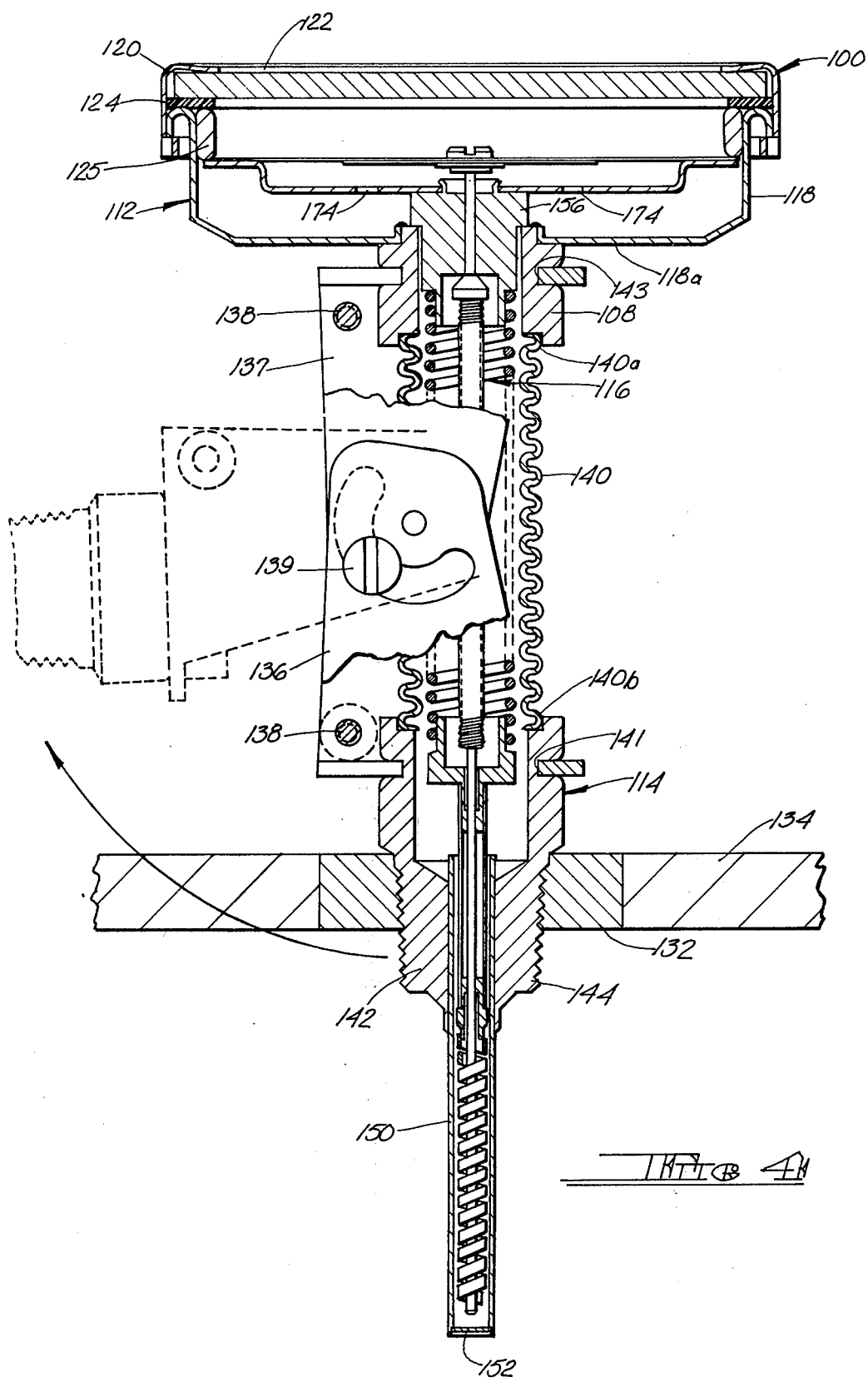

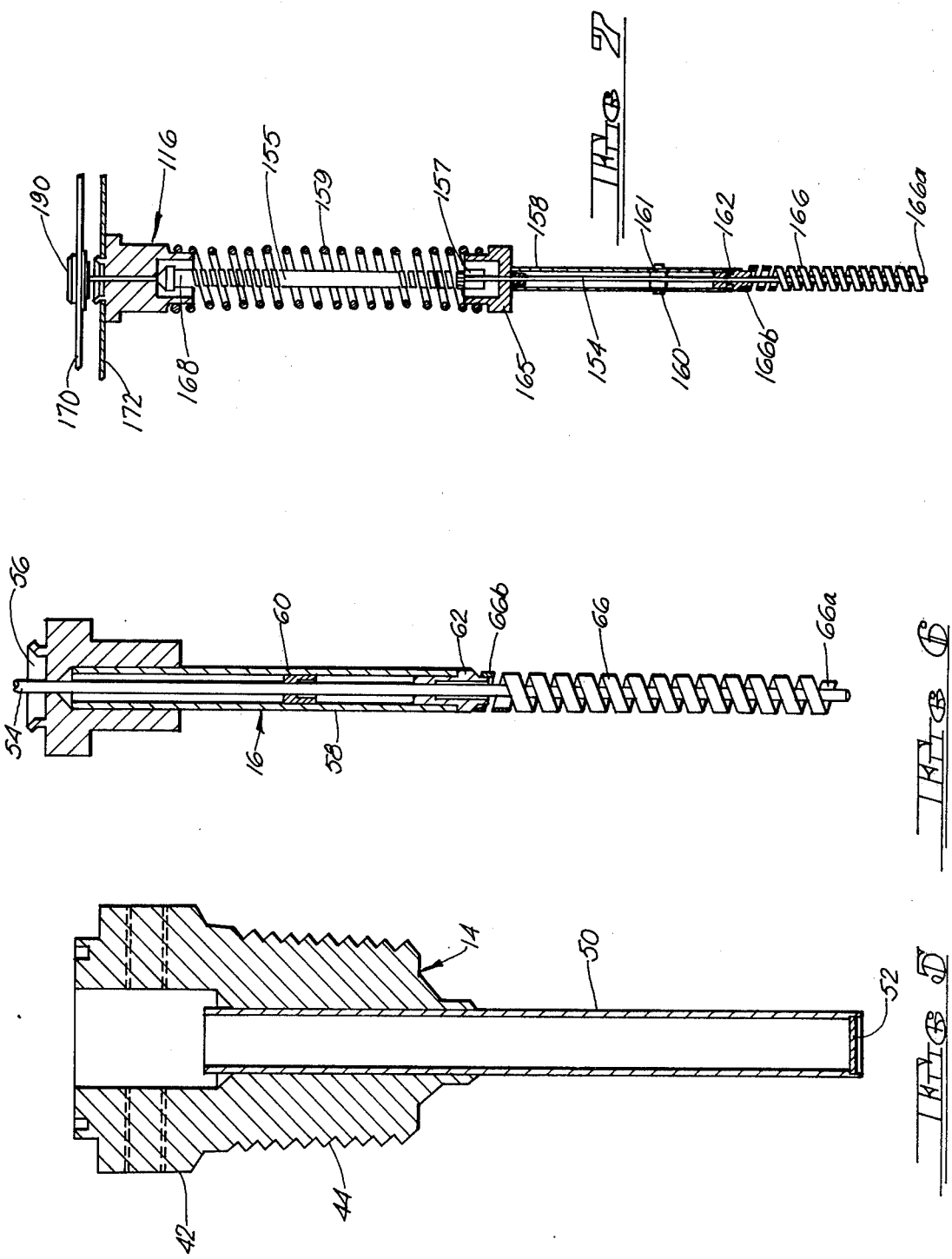

REPLACEABLE SENSING AND INDICATING ELEMENT FOR A BI-METALLIC THERMOMETER

BACKGROUND OF THE INVENTION

1. Field of the Invention

The apparatus of the present invention relates generally to dial indicating bi-metallic thermometers and more particularly to a bi-metallic thermometer having a replaceable sensing and indicating element.

2. Description of the Prior Art

A bi-metallic thermometer comprises an enclosure consisting of a stem terminating in a case. A bi-metallic helical temperature sensing coil disposed within the stem imparts rotary motion to a shaft, which extends into the case and terminates in a pointer. The sensing coil, the shaft and the pointer rotate with variations in temperature, providing a visual indication on a graduated dial mounted in association with the pointer.

Although bi-metallic thermometers have found wide usage, historically such instruments have required replacement in a relatively short period of time. As a result of breakage or instrument failure, certain studies have discovered that the average life expectancy of a bi-metallic thermometer is approximately four years. Frequent replacement of such instruments has required the user to maintain a considerable inventory of replacement units or has necessitated prolonged shutdown of expensive equipment. Furthermore, even calibration of conventional bi-metallic thermometers requires removal from their operating environment, interferring with production processes. Similar interuptions occur when a thermometer must be replaced with a unit having a different temperature scale. In spite of these obvious problems, there has not been a successful bi-metallic thermometer whose replacement does not interfer with its operating environment.

SUMMARY OF THE INVENTION

The present invention provides an improvement in bi-metallic thermometers by providing a replaceable sensing and indicating element which can be easily removed from the thermometer enclosure without removing the entire thermometer from its operating environment. The improvement comprises a sensing and indicating element telescopically received in the thermometer case. The sensing and indicating element has a stem terminating in a bi-metal helical temperature sensing coil and a shaft extending from the coil and disposed within the stem. An indicating pointer is secured to the free end of the shaft and is associated with a calibrated scale. The replaceable sensing and indicating element is held in place within the thermometer case by a cam-action bezel ring engaging the case in cooperation with a series of gaskets. By removing the bezel ring and gaskets, the replaceable sensing and indicating element may be easily removed from and replaced in the thermometer case. The dial face of the thermometer may be rotated for orienting the calibrated scale for the best viewing conditions.

In addition, the replaceable sensing and indicating element may be used with a universally mounted bi-metallic thermometer, such as that described in U.S. Pat. No. 3,952,596, wherein the case, pointer, shaft and bi-metal coil may be rotated to any desired position for easy reading of the calibrated scale. Also the replaceable sensing and indicating element may be used with existing conventional bi-metallic thermometers.

BRIEF DESCRIPTION OF THE DRAWINGS

FIG. 1 is a perspective view of a typical bi-metallic thermometer containing the replaceable sensing and indicating element of the present invention.

FIG. 2 is a fragmentary exploded perspective view of a typical bi-metallic thermometer containing the replaceable sensing and indicating element of the present invention.

FIG. 3 is an enlarged cross-sectional view of the bi-metallic thermometer of FIG. 1.

FIG. 4 is a cross-sectional view of a universally mounted bi-metallic thermometer containing the replaceable sensing and indicating element of the present invention.

FIG. 5 is an enlarged cross-sectional view of the stem assembly of the thermometer of FIG. 1.

FIG. 6 is an enlarged fragmentary cross-sectional view of the replaceable sensing and indicating element of the thermometer of FIG. 1.

FIG. 7 is a fragmentary cross-sectional view of the replaceable sensing and indicating element of the universally mounted thermometer of FIG. 4.

DESCRIPTION OF THE PREFERRED EMBODIMENTS

A typical bi-metallic thermometer shown generally at 10, which may utilize the replaceable sensing and indicating element of the present invention, comprises a case assembly shown generally at 12, a stem assembly shown generally at 14, and a replaceable sensing and indicating element shown generally at 16.

The case assembly 12 consists of a cup shaped metal case 18 with a bezel ring 20, a transparent glass or plastic window 22, a resilient gasket 24 and a spacer ring 25. The bezel ring 20 may be a cam type having notches so that it may be spun firmly over flange 26 of case 18, thereby effecting a tight hermetical seal between window 22 and case 18.

The stem assembly 14 consists of a stem connector 42 of hexagonal cross-section provided with a tapered pipe thread 44, permitting the connector to form a strong and tight joint when threaded with sufficient force into a mating fitting (not shown) in a duct, pipeline or the like. A tubular stem 50, with the lower end 52 thereof closed, as by a plug or the like, extends from stem connector 42.

The replaceable sensing and indicating element 16, as is best seen in FIG. 3 and FIG. 6 comprises a shaft 54, a bearing 56, actuator tubing 58, spacer 60, coil support 62, bi-metallic coil 66, pointer 70, and circular dial 72. The shaft 54, which extends into the stem assembly 14, is secured, such as by spot welding, to the lower end 66a of the bi-metallic coil 66. The upper end 66b of coil 66 is secured to coil support 62 which is in turn secured, such as by spot welding, to the acutator tubing 58. Actuator tubing 58 is affixed to the bearing 56. A pointer 70 is secured to the upper end of the shaft 54 by means of hub 90. A circular dial 72, graduated in terms of the temperature to be measured, is mounted concentric with bearing 56. Replaceable sensing and indicating element 16 may be easily inserted into or removed from stem assembly 14 through the case 18.

Bi-metallic thermometers are calibrated at the place of manufacture to a high degree of accuracy. Normal assembly procedure calls for calibration of every thermometer by immersing the assembly in controlled temperature test bath or baths. At a known temperature within the range of the instrument, the pointer 70 is attached to the shaft 54 by means of the hub 90. At this time the pointer is aligned with the corresponding graduation on the circular dial 72. The bi-metallic helical coil 66 has been sized to give proper travel of the pointer 70 over the face of the dial 72 for the temperature range selected. After the calibration procedure has been verified to be correct for the instrument's range and found to be accurate within desired limits, the replaceable sensing and indicating element 16 is assembled into the thermometer case.

In operation, when tightening the threads 44 of stem connector 42 into a suitable fitting (not shown) in which it is to be received, it may be found that dial 72 does not arrive at a position where it may be read. To provide an alignment feature, dial 72 is provided with a pair of apertures 74. To align the dial face 72, bezel ring 20, window 22, resilient gasket 24, and spacer ring 25 are removed to expose dial 72. A pointed object, such as a sharpened end of a lead pencil, is inserted into one of the apertures 74 and dial face 72 is rotated until the proper orientation is achieved. The thermometer may then be reassembled in its operating configuration.

During assembly, replaceable sensing and indicating element 16 is inserted into case assembly 12 and the dial face aligned as previously described. Spacer ring 25 is positioned on dial face 72 and gasket 24 rested upon ring 25 and flange 26. As is clearly shown in FIG. 3, window 22 overlies gasket 24 and is held firmly in place by cam-action bezel ring 20, which is locked in position by rotating ring 20 with respect to case assembly 12, thereby forming a tight hermetic seal. It will be understood that disassembly of the sensing and indicating element 16 for replacement, realignment or repair may be accomplished by repeating the aforementioned assembly steps in reverse order.

FIG. 4 shows another embodiment of the replaceable sensing and indicating element, shown generally at 116, contained in a universally mounted bi-metallic thermometer 100. The general construction of the universally mounted bi-metallic thermometer is well understoood by one skilled in the art and is described in detail in U.S. Pat. No. 3,952,596. The replaceable sensing and indicating element 116 used with the universally mounted bi-metallic thermometer 100 is shown clearly in FIG. 4 and FIG. 7. As will be apparent to one skilled in the art, the universally mounted bi-metallic thermometer 100 also comprises a case assembly shown generally at 112, a stem assembly 114, clamp assembly 136, and a replaceable sensing and indicating element 116. The case assembly 112 is similar to the case assembly 12 of the embodiment of FIGS. 1 through 3, and comprises a case 118, bezel ring 120, transparent window 122, resilient gasket 124, spacer ring 125, and case connector 108. Case connector 108 is preferably secured to the underside 118a of the case 118 by welding and supports bearing 156 of replaceable sensing and indicating element 116.

The stem assembly 114 includes a stem connector 142 having tapered pipe threads 144, and a tubular stem 150 with its lower end 152 closed, such as by a plug welded to the tubing. The stem connector 142 is of hexagonal cross-section and the tapered pipe threads 144 permit the attainment of a strong and tight joint when the stem connector 142 is threaded with sufficient force into a mating fitting 132 in a duct, pipeline or the like 134.

The case and stem assemblies 112 and 114, respectively, are held together by the bellows tubing 140, one end 140a of which is welded to the case connector 108 and the other end 140b of which is welded to the case stem connector 142.

Clamp assembly 136 is constructed so that the case assembly 112 may be pivoted in any plane about the stem assembly 114, as indicated in dashed lines. The clamp assembly 136 includes two clevis clamps, one of which is shown at 137, which are held together by screws 138 and 139. The clamp assembly 136 is held in position on the thermometer 100 by insertion into grooves 143 and 141 of the case and case stem connectors 108 and 142, respectively. Two opposed screws, one of which is shown at 139, are provided for tightening and loosening the clamp assembly 136 so that any angular adjustment may be achieved.

The replaceable sensing and indicating element 116 used with universally mounted bi-metallic thermometer 100 is best seen in FIG. 7. The bi-metallic coil support 162 is secured, as by spot welding, to the actuator tubing 158. The upper end 166b of the helical bi-metallic coil 166 is secured, as by spot welding, to the coil support 162 on the actuator tubing 158. Depending upon the length of the actuator tubing 158, a number of spacer sleeves 160 and guides 161 may be provided on the actuator tubing 158. The lower end 166a of the bi-metallic coil 166 is secured, as by spot welding, to the shaft 154, which passes through the guide 161 into the actuator tubing 158 and terminates in the outer spring support 165. As can be seen, motion is transmitted from the bi-metallic coil 166 to the pointer shaft 168 by the edge wound coil 155, which is supported by the pointer shaft 168 on one end and the inner spring support 57 on the other end. The inner spring support 157 is secured, as by spot welding, to the shaft 154 which carries the bi-metallic coil 166. The pointer shaft 168 is inserted into the bearing 156 of the replaceable sensing and indicating element 116. The bearing 156 of element 116 and the outer spring support 165 are held together by the outer spring 159.

During assembly, replaceable sensing and indicating element 116 is inserted into the case assembly 112 and hermetically restrained by bezel ring 120 acting in conjunction with window 122, gasket 124, and spacer ring 125, as previously indicated in connection with the thermometer 10 of the embodiment of FIGS. 1 through 3. Disassembly for replacement, realignment or repair is accomplished by reversing the assembly procedure. Normal procedure calls for calibration of every thermometer by immersing the assembly in a controlled temperature test bath or baths. At a known temperature within the range of the instrument, the pointer 170 is attached to the pointer shaft 168 by mean of the hub 190 of the pointer 170. At this time the pointer 170 is aligned with the corresponding graduation on the face of the circular dial 172. The bi-metallic coil 166 is sized to provide proper travel of the pointer 170 over the face of the dial 172 for the temperature range selected.

When tightening the threads 144 of the stem connector 142 into a fitting 132 of a duct, pipeline or the like 134, the face of the circular dial 172 will not always arrive in a position allowing for convenient reading. However, repositioning of the face of the circular dial 172 may be accomplished without loss of calibration. As described hereintofore in connection with the thermometer 10 of the embodiment of FIGS. 1 through 3, the bezel ring 120, transparent window 122, resilient gasket 124, and spacer ring 125 may be removed exposing the face of circular dial 172. A pointed object, such as the sharpened end of a pencil, is inserted into one of the apertures 174, and the dial 172 rotated to bring the graduations into the proper viewing position. Thereafter, the spacer ring, gasket, transparent window and bezel ring may be replaced. In order to achieve the desired angle position adjustment, screws 138 and 139 are loosened and the clamp assembly 136 rotated until the longitudinal axis of the screws 138 are substantially perpendicular to the plane of the desired bend. The case 118 is then grasped and the clamp assembly 136 bent to the required angle, whereupon the screws 138 and 139 may be tightened.

Modifications may be made in the invention without departing from the spirit of it.

The embodiments of the invention in which an exclusive property or privilege is claimed are defined as follows:

1. In a bi-metallic thermometer of the type having an enclosure secured to support means for mounting said thermometer in an operating environment, the improvement in combination therewith comprising, a replaceable sensing and indicating element for sensing temperatures, said element being selectively movable and providing a visual indication of the temperature of said operating environment, said element being easily removable from and replaceable in said enclosure, said element comprising a stem terminating in a bi-metal helical temperature sensing coil rotatable with changes in temperature, a shaft extending from said coil and disposed within said stem for transmitting the rotary motion of said coil, an indicating pointer secured to said shaft, and a calibrated scale affixed to said stem and adjacent with said pointer for providing a visual indication of said temperature, and restraining means coacting with said element to maintain said element in said enclosure.

2. The thermometer according to claim 1 wherein said restraining means comprises a bezel ring communicating with said enclosure, a transparent window engaged by said bezel ring for viewing said calibrated scale, a metallic ring mounted on said scale, and a resilient gasket disposed between said window and said ring for sealing said enclosure.

3. The thermometer according to claim 1, wherein said element is rotatably received within said enclosure and said scale thereof includes at least one aperture, whereby said element may be aligned for proper viewing by an observer.

4. The thermometer according to claim 1 wherein at least a portion of said shaft and said stem are non-rigid, permitting said thermometer to be rotated to any desired position.

* * * * *